(12) United States Patent  (10) Patent No.: US 7,514,880 B2
Huang et al.  (45) Date of Patent: Apr. 7, 2009

(54) LIGHTING APPARATUS FOR PROJECTOR

(75) Inventors: Jain-Chung Huang, Miao-Li County (TW); Chih-Neng Tseng, Miao-Li County (TW); Chih-Nan Wu, Miao-Li County (TW); Ching-Kao Pan, Miao-Li County (TW)

(73) Assignee: Coretronic Corporation, Hsinchu Science Park, Hsin-Chu (TW)

( * ) Notice: Subject to any disclaimer, the term of this patent is extended or adjusted under 35 U.S.C. 154(b) by 540 days.

(21) Appl. No.: 11/306,362

(22) Filed: Dec. 25, 2005

(65) Prior Publication Data

US 2006/0197468 A1  Sep. 7, 2006

(30) Foreign Application Priority Data

Jan. 7, 2005  (TW) .............................. 94100581 A

(51) Int. Cl.
 *H05B 37/02* (2006.01)
(52) U.S. Cl. ........................ 315/291; 315/246; 315/247
(58) Field of Classification Search ................. 315/246, 315/247, 291, DIG. 2, DIG. 7, 362
 See application file for complete search history.

(56) References Cited

U.S. PATENT DOCUMENTS 6,072,282 A * 6/2000 Adamson ..................... 315/276
6,348,902 B1 * 2/2002 Lee ............................. 345/1.1

* cited by examiner

*Primary Examiner*—Douglas W Owens
*Assistant Examiner*—Jianzi Chen
(74) *Attorney, Agent, or Firm*—Winston Hsu

(57) ABSTRACT

A lighting apparatus for a projector comprises a control module, a lamp driver and a transient voltage suppression circuit, in which the control module is used for generating a lighting signal, the lamp driver is used for receiving the lighting signal and controlling a lamp according to the lighting signal, and the transient voltage suppression circuit is disposed between the control module and the lamp driver, used for transmitting said lighting signal to the lamp driver and attenuating a high transient voltage generated at the instant the lamp driver lights up the lamp. The present invention is used to lower the high transient voltage through the transient voltage suppression circuit. Whereby, the control module is protected and the stability of the projector is further enhanced.

10 Claims, 3 Drawing Sheets excerpt of US 7,514,880 B2

LIGHTING APPARATUS FOR PROJECTOR

BACKGROUND OF THE INVENTION

1. Field of the Invention

The present invention relates to a projector, and more particularly to a lighting apparatus for a projector.

2. Description of Related Art

Please refer to FIG. 1. A lighting apparatus 10 of a conventional projector comprises a control module 12, a lamp driver 13 and a lamp 14, in which the control module 12 is used for controlling an operation of each element in the projector and connected to the lamp driver 13 so as to provide a lighting signal to the lamp driver 13. The lamp driver 13 is connected with the lamp 14 and drives gas in the lamp 14 to be ionized to light up the lamp 14 by exerting a high transient voltage (generally is 5K to 15K volts) to the lamp 14.

However, because the high transient voltage is transmitted back to the control module 12 through a signal cable connected between the lamp driver 13 and the control module 12 at instant that the lamp 14 is lighted. The control module 12 causes the projector to operate erroneously and work abnormally because of the high transient voltage so that an operation stability of the projector is lowered, and the influence to the projector is more serious under frequently turning on and off the projector.

Therefore, how to decrease damage on the control module 12 by the high transient voltage generated at the time that the lamp 14 is driven and enhance the stability of the projector are important objects.

SUMMARY OF THE INVENTION

One object of the present invention is to provide a lighting apparatus for a projector, enabling a high transient voltage to be lowered so as to attain to the protection of a control module and a stability of the projector through a disposition of a transient voltage suppression circuit between the control module and a lamp driver.

For attaining to the object mentioned above, a lighting apparatus for a projector of the present invention comprises a control module, a lamp driver and a transient voltage suppression circuit, in which the control module is used for generating a lighting signal, the lamp driver is used for receiving the lighting signal and controlling a lamp according to the lighting signal. The transient voltage suppression circuit is disposed between the control module and the lamp driver. The transient voltage suppression circuit is used for transmitting the lighting signal to the lamp driver and attenuating the high transient voltage generated from the lamp driver when the lamp driver lights up the lamp. The present invention is to attenuate the high transient voltage through the transient voltage suppression circuit to protect the control module and further to enhance the stability of the projector.

BRIEF DESCRIPTION OF THE DRAWINGS

The present invention can be more fully understood by reference to the following description and accompanying drawings, in which.

DETAILED DESCRIPTION OF THE PREFERRED EMBODIMENTS

Figure 1:
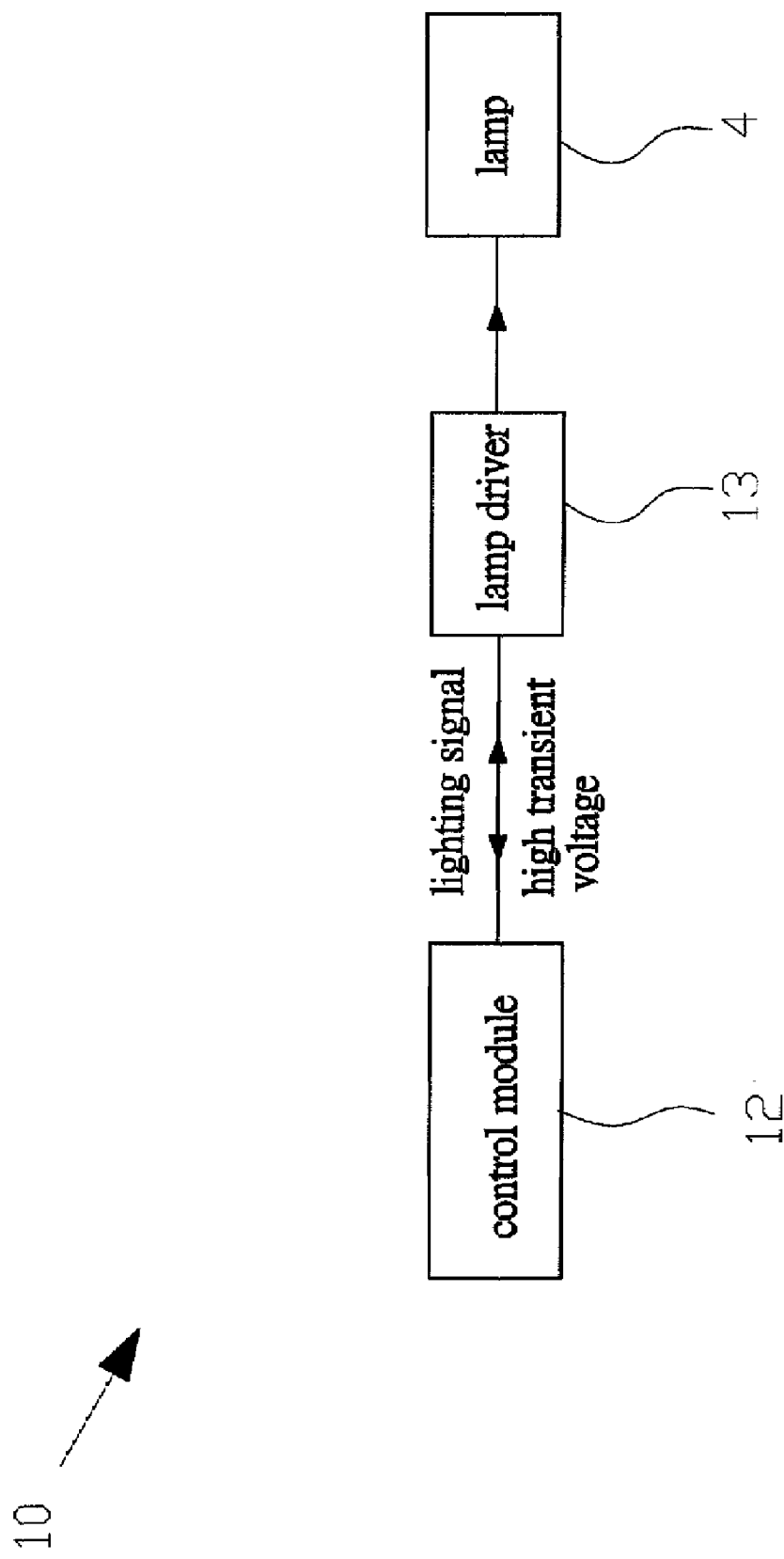
FIG. 1 is a block diagram, showing element dispositions of a conventional projector.
Figure 2:
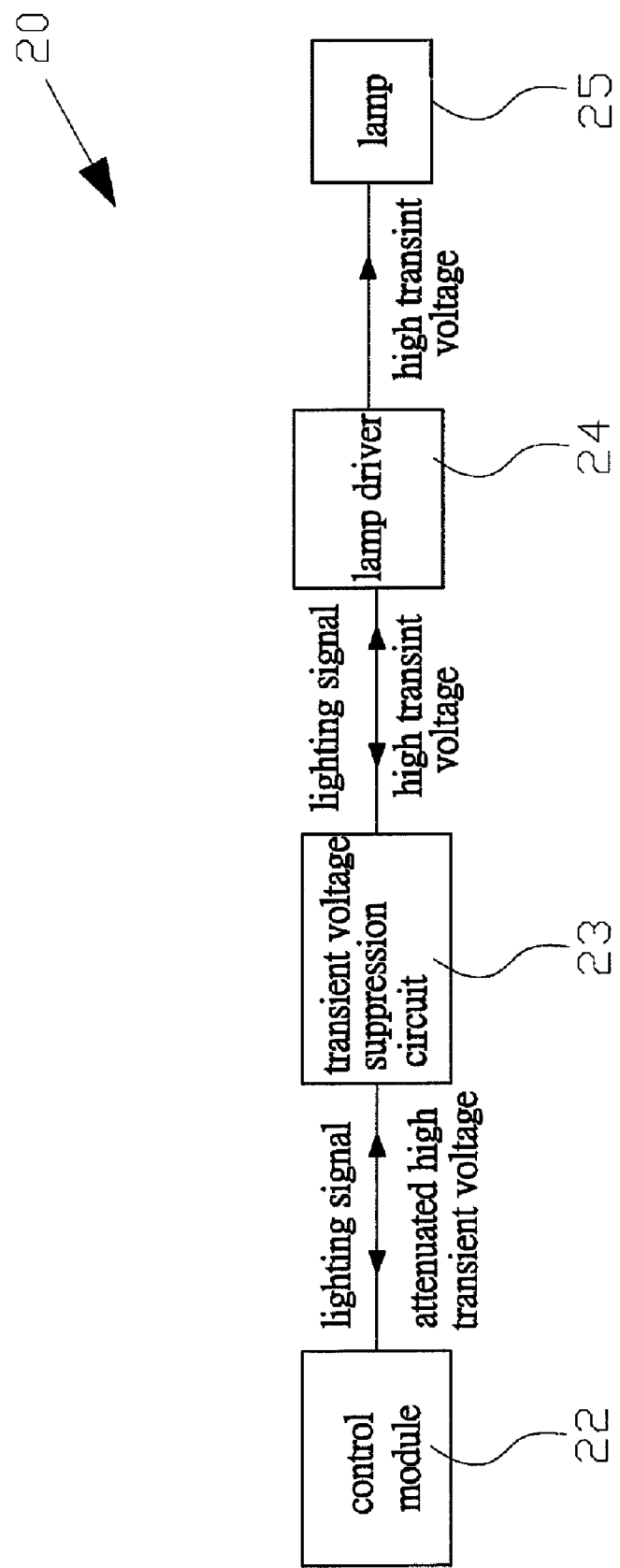
FIG. 2 is a block diagram, showing element dispositions of a lighting apparatus for a projector according to the present invention.

Please refer to FIG. 2. A lighting apparatus 20 for a projector according to the present invention comprises a control module 22, a transient voltage suppression circuit 23, a lamp driver 24 and a lamp 25, in which the control module 22 is used for controlling an operation of each element in the projector and connected to the transient voltage suppression circuit 23 to transmit a lighting signal to the transient voltage suppression circuit 23. The transient voltage suppression circuit 23 is disposed between the control module 22 and the lamp driver 24 and used for receiving the lighting signal output from the control module 22 and outputting the lighting signal to the lamp driver 24. The lamp driver 24 is connected with the lamp 25 and the transient voltage suppression circuit 23. The lamp driver 24 receives the lighting signal output from the transient voltage suppression circuit 23 and generates a high transient voltage according to the lighting signal to light up the lamp 25. Furthermore, the lamp driver 24 transmits back another high transient voltage to the transient voltage suppression circuit 23 at the instant that the lamp driver 24 lights up the lamp 25. The transient voltage suppression circuit 23 processes an attenuation procedure after the transient voltage suppression circuit 23 receives the high transient voltage transmitted back from the lamp driver 24 and then transmits the attenuated high transient voltage back to the control module 22. Because the high transient voltage is already lowered by the transient voltage suppression circuit 23, damage of the control module 22 yielded from the high transient voltage can be reduced and to protect the control module 22.

Figure 3:
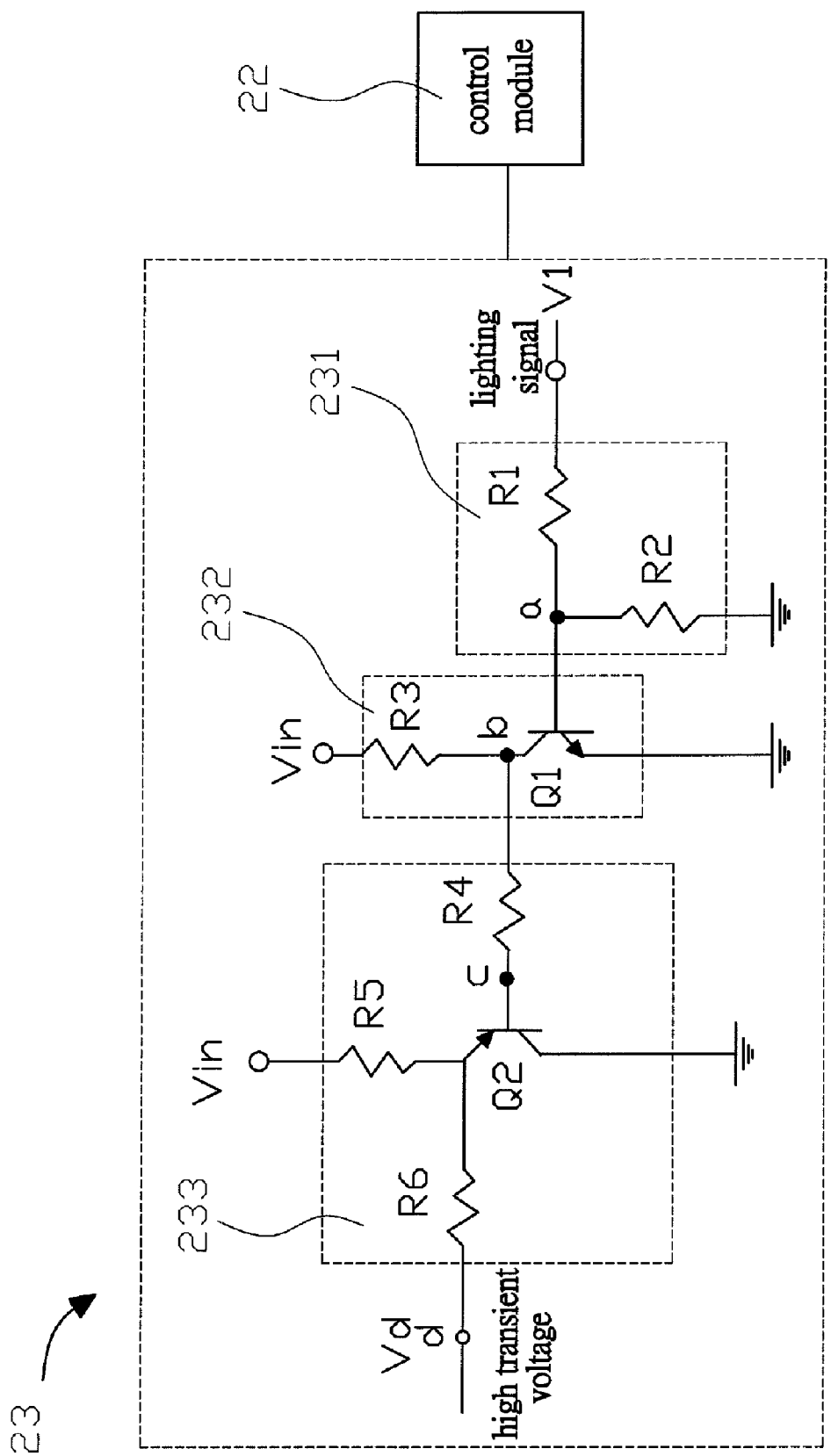
FIG. 3 is a circuit diagram, showing an internal circuit of a transient voltage suppression circuit according to the present invention.

Please refer to FIG. 3. FIG. 3 is a circuit diagram, showing the transient voltage suppression circuit 23 of a preferred embodiment according to the present invention. The transient voltage suppression circuit 23 comprises resistors R1 to R6 and two transistors Q1 and Q2, in which the transistor Q1 is NPN type and the transistor Q2 is PNP type. A base of the transistor Q1 is connected to a lighting signal with a voltage V1 through the resistor R1, and one end of a resistor R2 is connected to a node a between the base and the resistor R1, and the other end thereof is grounded. An emitter of the transistor Q1 is grounded and the collector thereof is electrically connected to an input voltage Vin through a resistor R3. One end of a resistor R4 is connected to a point b between the collector of the transistor Q1 and the resistor R3, and the other end thereof is connected to a base of the transistor Q2. A collector of the transistor Q2 is grounded and an emitter thereof is electrically connected to the input voltage Vin through a resistor R5. One end of a resistor R6 is connected between the emitter of the transistor Q2 and the resistor R5 and the other end thereof is connected to a high transient voltage Vd. The resistors R1 and R2 constitute a voltage divider circuit 231. The resistor R3 and the transistor Q1 constitute a suppression circuit 232. The resistors R4, R5, R6 and the transistor Q2 constitute a buffer circuit 233. When the control module 22 inputs the lighting signal with voltage V1, an output voltage at the node a of the voltage divider circuit 231 is determined through the voltage divider circuit 231 and by operating in coordination with the selection of the proper resistors R1 and R2 to allow the voltage Va of the node a of the circuit to be larger than the cut-in voltage of the transistor Q1. Thereafter, the voltage difference between the emitter and the collector of the transistor Q1 is a constant close to 0 volt via the suppression circuit 232 and by choosing the proper resistor R3 and controlling the input voltage Vin of the resistor R3. The transistor Q1 is operated in a saturation region and contributive to voltage gain. Because the transistor Q1 is a common emitter amplifier, a definite gain (it is amplification gain larger than 1) can be amplified for the voltage Vb of the node b of the circuit relative to the voltage V1 of the lighting signal. Thereafter, the voltage Vc of the node c of the circuit is caused to be larger than the cut-in voltage of the transistor Q2 via the buffer circuit 233 and by choosing the proper resistor R4, and the voltage difference between the emitter and the collector of the transistor Q2 is caused to be a constant close to 0 volt by operating in coordination with the selection of the proper resistor R5 and controlling the input voltage Vin of the resistor R5. At this time, the transistor Q2 is operated in a saturation region. Because the transistor Q2 is a common collector amplifier, the amplification gain of the voltage Vd of the node d relative to the voltage Vc of the node c is approximately 1. The definite gain of the lighting signal is first amplified via the suppression circuit 232, and the lighting signal with amplified definite gain is then transmitted to the lamp driver 24 through the buffer circuit 233.

At the same time that the lamp driver 24 lights up the lamp 25, a reverse high transient voltage generated from the lamp driver 24 is transmitted back to the transient voltage suppression device 23 from the lamp driver 24, and the resistor R6 in the buffer circuit 233 is utilized to transmit the high transient voltage back to the emitter of the transistor Q2. The transistor Q2 enables a first level isolation protection against the high transient voltage through the buffer circuit 233. Thereafter, the buffering processed high transient voltage is transmitted back to the collector of the transistor Q1 through the resistor R4, and the voltage difference between the emitter and the collector of the transistor Q1 is then caused to be a definite value close to 0 volt through the suppression circuit 232 and by choosing the proper resistor R3 and controlling the input voltage Vin of the resistor R3. The transistor Q1 is operated in a saturation region. Because the transistor Q1 is a common emitter amplifier, this allows a definite gain to be attenuated for the reverse high transient voltage Vb relative to the voltage V1 of the lighting signal. Therefore, the high transient voltage is processed the attenuation of the definite gain through the suppression circuit 232, and the attenuated high transient voltage is then transmitted back to the control module 22 through the resistor R1 from the base of the transistor Q1. Whereby, the control module 22 can be protected, and the stability of the projector can be enhanced.

Besides, a proper amplification gain of transistor is chosen to be a transient voltage suppression circuit according to the practical need, and a variable resistor can be replaced with the voltage divider circuit.

Additional advantages and modifications will readily occur to those skilled in the art. Therefore, the invention in its broader aspects is not limited to the specific details and representative embodiments shown and described herein.

Accordingly, various modifications may be made without departing from the spirit or scope of the general inventive concept as defined by the appended claims and their equivalents.

What is claimed is:

1. A lighting apparatus for a projector, comprising:
    a control module, used for generating a lighting signal;
    a lamp driver, connected to said control module and used for receiving said lighting signal and controlling a lamp according to said lighting signal, said lamp driver generating a high transient voltage to said control module when said lamp lightens; and
    a transient voltage suppression circuit, disposed between said control module and said lamp driver, used for transmitting said lighting signal to said lamp driver, and attenuating said high transient voltage and then outputting said attenuated high transient voltage to said control module.

2. The lighting apparatus according to claim 1, wherein said transient voltage suppression circuit comprises:
    a voltage divider circuit, having a plurality of resistors used for determining a voltage value of a node, and one end of said voltage divider circuit being connected to said control module;
    a suppression circuit, connected to said node of said voltage divider circuit, and comprising at least one transistor, said transistor being a common emitter amplifier, a reverse high transient voltage being attenuated through said transistor; and
    a buffer circuit, connected to a node of said suppression circuit, comprising at least one transistor, and said transistor being a common collector amplifier and used for isolating said reverse high transient voltage.

3. The lighting apparatus according to claim 2, wherein at least one of said resistors comprises a variable resistor.

4. The lighting apparatus according to claim 2, wherein a base of said transistor of said suppression circuit is connected with said node of said voltage divider circuit.

5. The lighting apparatus according to claim 2, wherein an emitter of said suppression circuit is grounded.

6. The lighting apparatus according to claim 2, wherein said suppression circuit further comprises a resistor and is connected to an input voltage through said resistor.

7. The lighting apparatus according to claim 2, wherein a base of said transistor of said buffer circuit is connected to said suppression circuit by a resistor.

8. The lighting apparatus according to claim 2, wherein an emitter of said transistor of said buffer circuit is respectively connected to an input voltage and said lamp driver through a plurality of resistors of said buffer circuit.

9. The lighting apparatus according to claim 2, wherein a collector of said transistor of said buffer circuit is grounded.

10. The lighting apparatus according to claim 2, wherein said transistor of said suppression circuit is NPN type, and said transistor of said buffer circuit is PNP type.

* * * * *